United States Patent
Autenrieth et al.

(10) Patent No.: US 7,261,750 B1
(45) Date of Patent: Aug. 28, 2007

(54) METHOD FOR THE AUTOTHERMAL REFORMING OF A HYDROCARBON

(75) Inventors: Rainer Autenrieth, Grossbbotwar (DE); Andreas Docter, Ulm (DE); Steffen Oliver Wieland, Wetzlar (DE)

(73) Assignee: DaimlerChrysler AG, Stuttgart (DE)

( * ) Notice: Subject to any disclaimer, the term of this patent is extended or adjusted under 35 U.S.C. 154(b) by 782 days.

(21) Appl. No.: 09/715,044

(22) Filed: Nov. 20, 2000

(30) Foreign Application Priority Data

Nov. 20, 1999 (DE) ................................ 199 55 929

(51) Int. Cl.
C01B 3/24 (2006.01)
(52) U.S. Cl. ...................... 48/198.1; 48/198.7; 48/212; 48/213; 48/61; 48/117; 48/197 R; 423/650; 423/651; 423/652; 252/373
(58) Field of Classification Search ............. 48/61, 48/62 R, 75, 64, 65, 89, 93–95, 127.9, 211, 48/198.1, 212, 198.7, 213, 215, 214 A, 214 R; 422/188–191, 193–195, 198–199, 203, 211, 422/222
See application file for complete search history.

(56) References Cited

U.S. PATENT DOCUMENTS

| | | | |
|---|---|---|---|
| 4,024,912 A | 5/1977 | Hamrick et al. ............. 166/57 |
| 4,113,445 A * | 9/1978 | Gettert et al. ............. 48/197 R |
| 4,833,171 A * | 5/1989 | Sweeney ..................... 518/703 |
| 5,458,857 A * | 10/1995 | Collins et al. ............. 422/198 |
| 5,549,877 A | 8/1996 | Gateau et al. ........... 423/245.3 |
| 5,826,422 A * | 10/1998 | Koyama et al. ........... 60/39.12 |
| 5,980,596 A * | 11/1999 | Hershkowitz et al. ..... 48/127.9 |
| 6,086,839 A * | 7/2000 | Autenrieth et al. ........ 423/350 |
| 6,521,204 B1 * | 2/2003 | Borup et al. ................ 423/652 |

FOREIGN PATENT DOCUMENTS

DE 690 03 604 6/1990
WO WO98/49093 11/1998

* cited by examiner

*Primary Examiner*—Glenn Caldarola
*Assistant Examiner*—Vinit H. Patel
(74) *Attorney, Agent, or Firm*—Crowell & Moring LLP

(57) ABSTRACT

A method for the autothermal reforming of a hydrocarbon, in particular of diesel, includes introducing a combustible mixture of the hydrocarbon to be reformed and an oxygen-containing medium into a first reaction zone of a reformer, A gas-phase reaction is ignited. After an operating temperature required for the autothermal reforming process is reached, water or a water-containing medium is introduced into the first reaction zone, and the water content is increased until the conditions for the reforming process of the hydrocarbon prevail. The reforming process then takes place predominantly in a second reaction zone.

7 Claims, 1 Drawing Sheet

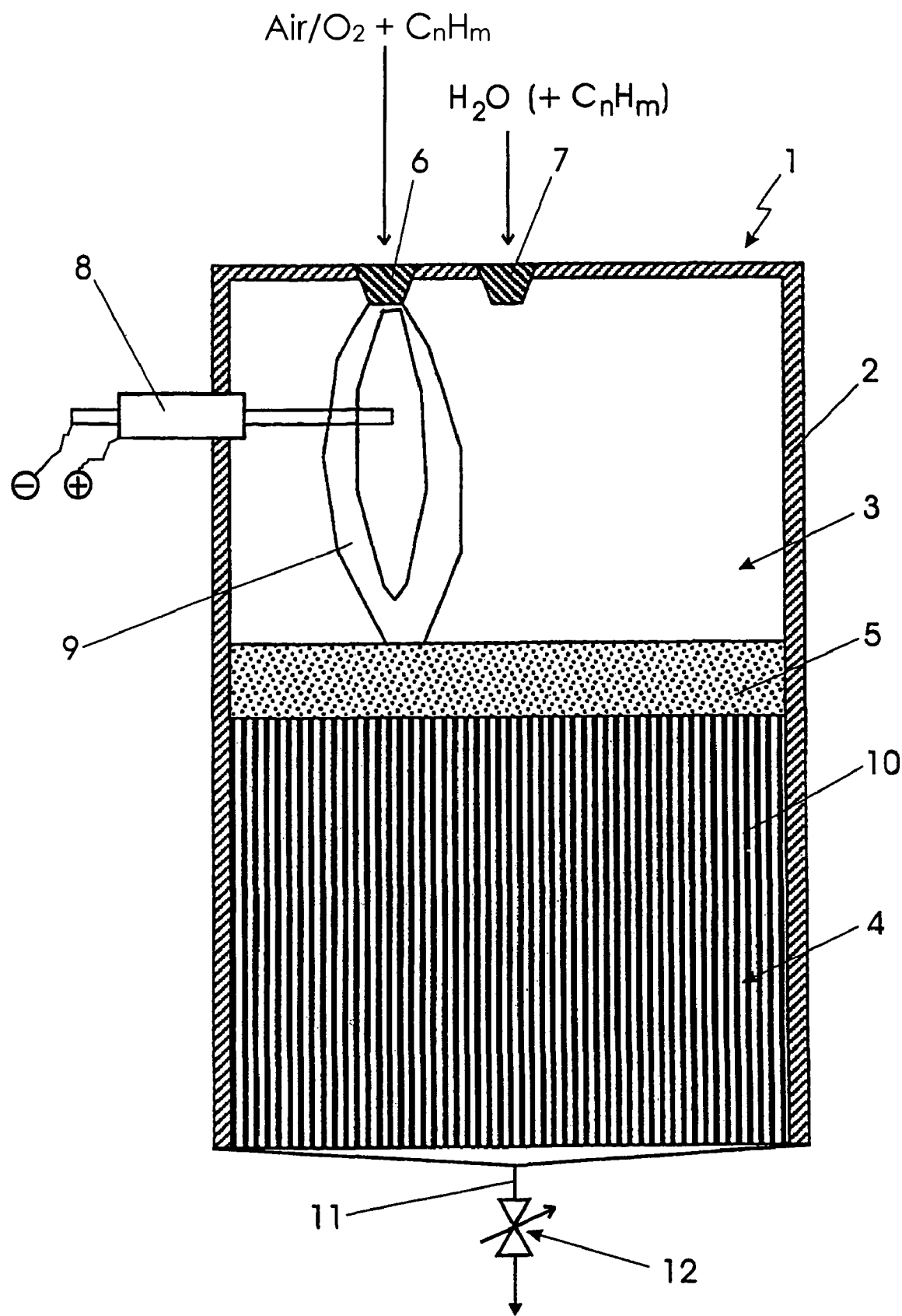

METHOD FOR THE AUTOTHERMAL REFORMING OF A HYDROCARBON

BACKGROUND AND SUMMARY OF INVENTION

This application claims the priority of German patent document DE 199 55 929.5, filed Nov. 20, 1999.

The present invention relates to a method for the autothermal reforming of a hydrocarbon, in particular of diesel, in a reformer. In addition, the invention relates to a device for carrying out the method.

Reformers or reactors in which the reforming of a hydrocarbon by means of a water-gas shift reaction takes place are known from the general prior art. This reforming usually takes place in an inner chamber of the reactor or reformer in the presence of a catalyst or compounds with a catalytic action. In general, the catalyst is applied to a honeycomb structure or to individual elements of a bed of bulk material, for example of ceramic pellets, situated in the reformer.

U.S. Pat. No. 4,024,912 discloses a method for reforming a hydrocarbon, in which a mixture of a hydrocarbon and an oxygen-containing medium is partially oxidized in a first stage following electrical ignition and is then catalytically converted in a second reaction stage with water being added.

U.S. Pat. No. 5,826,422 and DE 69003604 T2 disclose further methods for the autothermal reforming of a hydrocarbon, in which a mixture of a hydrocarbon and an oxygen-containing medium is partially oxidized in a first reaction zone following electrical ignition and is then catalytically reformed in a second zone, the addition of water taking place in the first reaction zone.

WO 9849093 A1 discloses an autothermal method in which, following ignition and partial oxidation of a mixture of hydrocarbon and oxygen in a first stage, catalytic reforming is carried out in a second stage. Apparently no external water is added in the catalytic stage, but rather the water which has also been generated to some extent in a secondary reaction during the partial oxidation is reacted.

To allow the reforming process, in particular an autothermal reforming process (i.e., a reforming process which has an overall balance in terms of its thermal energy) to take place in the reformer, certain boundary conditions are required. This means that, depending on the hydrocarbon used, a temperature of from 600° C. to 1200° C. and a water content of from 10% to 40% in the starting materials must usually prevail in the reformer, in order to allow the corresponding reaction to take place.

In the case of long-chain hydrocarbons or a mixture of hydrocarbons which contains long-chain, high-boiling hydrocarbons, starting the reforming process causes problems. The preheated reaction materials cool down again in the reformer, which is still cold. As a result, in addition to the partial reforming which is already taking place, a large number of undesirable by-products are formed. In particular, the long-chain hydrocarbons leave behind residues in the reformer, which impair the gas permeability of the system and the interaction of the starting materials for the reforming with the catalytic materials.

The object of the present invention is to provide a method for the autothermal reforming of a hydrocarbon, in particular of diesel, in a reformer, in which method, after the system has been started, the required operating temperature can be reached as quickly as possible, so that no undesirable by-products are formed.

According to the present invention, to start the autothermal reforming process, a combustible mixture of (1) the hydrocarbon to be reformed, such as for example diesel; and (2) an oxygen-containing medium, such as for example air, is introduced into a first reaction zone of the reformer. This reaction zone of the reformer also contains a device for supplying energy, by which a gas-phase reaction in the mixture is initiated. This gas-phase reaction supplies thermal energy through the at least partial oxidation of the hydrocarbon to be reformed by the oxygen.

According to the present invention, this thermal energy is used to heat the reformer to the required operating temperatures of from 600° C. to 1200° C. Only then is water or a water-containing medium added. This supply of water is increased until the conditions for the autothermal reforming process of the hydrocarbon prevail. This means a water content of approximately 10% to 40% of the starting materials fed to the reformer, as is known in principle from the autothermal reforming of hydrocarbons.

According to the present invention, the actual reforming process, after it has been started by the gas-phase reaction, takes place in a second reaction zone of the reformer.

This method therefore allows the reformer to be heated very quickly, the energy required for this purpose, at least approximately for the most part, being obtained in a particularly advantageous way from the operating substance which is to be reformed. Only the energy required for ignition has to be supplied in some other way.

In a particularly advantageous configuration of the invention, the energy required to ignite the gas-phase reaction is applied as electrical energy. By way of example, if the system is to be used in a gas-generation system for fuel cells, such as for example for on-board current generation in motor vehicles, only a small amount of energy has to be taken from the batteries to ignite the gas-phase reaction. This relieves the load on the batteries in particular in the starting phase of the journey (i.e., when the system as a whole has not yet reached its ultimate temperature and efficiency), so that the energy from the batteries is very predominantly available for driving purposes.

The apparatus according to the present invention for carrying out the method provides a reformer which has at least two reaction zones. The gas-phase reaction according to the invention for heating the reformer takes place in the first reaction zone. Apart from at least one nozzle device and the device for introducing the energy required for ignition of the gas-phase reaction, the first reaction zone is empty. This allows the gas-phase reaction to form ideally in the first reaction zone of the reformer or reactor. The second reaction zone has catalysts which are customary for the water-gas shift reaction and are applied to a metallic honeycomb structure or to a bed of metallic or ceramic pellets. An intermediate element is situated between the two reaction zones. This intermediate element is gas-permeable and has a large outer and inner surface, in order to prevent the gas-phase reaction from penetrating directly into the second reaction zone by rapid dissipation of the thermal energy in that region of the gas-phase reaction which is in contact with the intermediate element, while allowing the gaseous starting materials to pass through almost without obstacle and distributing the heat which is generated as uniformly as possible.

Other objects, advantages and novel features of the present invention will become apparent from the following detailed description of the invention when considered in conjunction with the accompanying drawings.

BRIEF DESCRIPTION OF THE DRAWING

The sole FIGURE shows a reformation reactor according to the present invention.

DETAILED DESCRIPTION OF THE DRAWING

The single FIGURE shows a reactor 1 or reformer having a reactor housing 2 which encloses a first reaction zone 3 and a second reaction zone 4. A gas-permeable intermediate element 5 is arranged between the two reaction zones 3, 4. The starting materials are fed into the reformer 1 via two nozzle devices 6, 7. The first nozzle device 6 is referred to below as the starter nozzle, since it is used primarily in the starting phase of the autothermal reforming in the reformer 1. The second nozzle device 7 is referred to below as the mixing nozzle 7, since in normal operation of the reformer this mixing nozzle 7 is used to introduce the starting materials for reforming hydrocarbon, in particular diesel, which are mixed outside or within the mixing nozzle 7 itself, into the reactor 1.

The first reaction zone 3 additionally has a device for supplying energy, in this case in particular a glow plug or spark plug 8. The remaining part of the first reaction zone 3 is otherwise empty, in order to provide sufficient space for the gas-phase reaction 9 which is ignited by the glow or spark plug 8 while an autothermal reforming process is started so that the reaction can expand and unfold ideally in the first reaction zone 3. The gas-phase reaction 9 is indicated as a flame 9.

The gas-phase reaction or flame 9 represents an oxidation reaction in which a mixture of the hydrocarbon to be reformed, e.g. diesel, and an oxygen-containing medium, such as for example air, is at least partially oxidized in the reaction zone at temperatures of above 1000° C. To ensure that the oxidation does not generate combustion residues, such as for example soot, it is particularly advantageous if the mixture of hydrocarbon and oxygen-containing medium contains more oxygen than would be required for complete combustion ($\lambda=1$). This combustion of a lean mix ensures that the carbon present in the hydrocarbon compound is practically completely burnt and there are no combustion residues, such as soot or the like, left in the reactor. These residues could block the intermediate element 5 or a catalyst structure 10 arranged in the second reaction zone 4 and supporting catalytically active compounds, and/or could impair the efficiency of this structure.

The intermediate element 5 should be designed as a gas-permeable intermediate element 5 with the largest possible outer and inner surfaces. A sintered metal, a metallic braid or a fill of metallic or ceramic particles placed between two mesh elements is in an optimum position to fulfil this task. The gas-phase reaction 9 is prevented from penetrating into the second reaction zone 4 by the intermediate element 5, since rapid dissipation of the thermal energy in that region of the gas-phase reaction 9 which is in contact with the intermediate element 5 avoids further oxidation of the gaseous starting materials in the region of the intermediate element 5. The gaseous starting materials or products of the gas-phase reaction 9 can pass through the intermediate element 5 unhindered. At the same time, the fact that the surface structure of the intermediate element 5 is as large as possible leads to the optimum possible distribution of the thermal energy generated by the gas-phase reaction 9, and this energy can be conveyed into the second reaction zone 4 by the gases flowing through the intermediate element 5. Moreover, the second reaction zone 4 or the catalyst structure 10 contained therein is heated by thermal conduction as a result of thermally conductive contact with both the reactor housing 2 and the intermediate element 5.

As has already been mentioned, the catalyst structure 10 may comprise a catalyst-coated honeycomb structure or a bed of catalyst-coated pellets. In an optional embodiment, it is also possible for the intermediate element 5 to already be provided with a catalytically active compound, e.g. by a coating.

After the operating temperature of approximately 600-1200° C. which is required for the hydrocarbon reforming has been reached in the reactor 1, at least in the first reaction zone 3, water or a water-containing medium is metered into the reactor 1 via the mixing nozzle 7. The amount of water added is increased until the starting-material mixture with a water content of (depending on the type of hydrocarbon) approximately 10% to 40%, which is required for the desired autothermal hydrocarbon reforming, is present in the reactor 1. This increasing addition of water or water-containing medium through the mixing nozzle 7 may take place on the basis of a linear or progressively rising function. However, for practical implementation it is particularly advantageous for the water to be added in steps, since this is sufficient for the hydrocarbon reforming to function and in terms of control engineering can be accomplished very easily and efficiently.

After the conditions with regard to temperature and the composition of the starting materials which are required for the autothermal hydrocarbon reforming to proceed have been reached, the autothermal hydrocarbon reforming takes place in the reactor 1, predominantly in the second reaction zone 4. At this time, it is possible to shut off the supply of the combustible mixture of hydrocarbon and oxygen-containing medium via the starter nozzle 6 and to supply further amounts of the starting materials only via the mixing nozzle 7.

This allows the starter nozzle 6 to be set particularly efficiently for the gas-phase reaction 9, so that this reaction takes place with a very high level of efficiency. By contrast, the structural design of the mixing nozzle 7 can be adapted to the mixture of starting materials required for the autothermal reforming of the hydrocarbon.

In addition to this embodiment with at least two nozzle devices 6 and 7, it is, of course, also possible to realize the method described with a single nozzle device 6.

The energy required to ignite the gas-phase reaction 9, which has been supplied in particular as electrical energy via the glow or spark plug 8, can be switched off after the gas-phase reaction 9 has started, and from this time the process proceeds without requiring further external energy which cannot be obtained directly from the hydrocarbon to be reformed. Therefore, after the autothermal reforming has commenced, there is no need to supply any further energy, since the autothermal reforming takes place in the reactor 1 as a reaction which is overall thermally neutral, neither generating nor requiring energy.

In the direction of flow of the starting materials or products, the reactor housing 2 has at least one outlet opening 11 or the like which leads the hydrogen-containing gas generated and the residual products which are present from the hydrocarbon reforming out of the reactor 1 to be processed further in other stages of a gas-generation system (not shown), e.g. for supplying a fuel cell. In the region of these outlet openings 11 there is a restrictable valve device 12 which allows the reactor 1 to be operated under a defined pressure after the autothermal hydrocarbon reforming has commenced. In the case of a fuel cell system or the like, this restrictable valve device may be arranged at the end of the use of the hydrogen-containing gas and the residual products, in order in this way to operate the reformer 1 as an element of an entire pressurized system.

The controllable, restrictable valve device 12 enables the reformer to be operated at least approximately at ambient pressure during the actual starting procedure, i.e. during the gas-phase reaction 9, and a pressure to be built up in the reformer 1 or the entire system, by closing the restrictable valve device 12, only when the boundary conditions, in terms of temperature and composition of the starting materials, which are required in order to start the autothermal hydrocarbon reforming have been reached. Together with the specific design of a dedicated starter nozzle 6, this allows a highly efficient gas-phase reaction 9 with very high thermal efficiency combined with very small amounts of undesirable by-products, such as for example soot or the like.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for the autothermal reforming of a hydrocarbon in a reformer, comprising:

feeding a combustible mixture of the hydrocarbon and an oxygen-containing medium into a first reaction zone of the reformer;

supplying energy to the first reaction zone thereby igniting a gas-phase reaction;

feeding water or a water-containing medium into the first reaction zone only after an operating temperature required for autothermal reforming is reached; and increasing a water content until conditions for the autothermal reforming of the hydrocarbon exist, wherein the autothermal reforming occurs predominantly in a second reaction zone and wherein the first reaction zone and the second reaction zone are separated by a gas-permeable intermediate element.

2. A method according to claim 1, wherein the hydrocarbon is diesel.

3. A method according to claim 1, wherein the energy supplied is electrical energy.

4. A method according to claim 1, wherein the combustible mixture comprises a greater amount of oxygen than required for complete combustion of the hydrocarbon.

5. A method according to claim 1, wherein the gas-phase reaction occurs at a temperature above 1000° C.

6. A method according to claim 1, wherein the increasing of the water content is in steps.

7. A method according claim 1, wherein, after the operating temperature required for the autothermal reforming process is reached, an outlet opening of the reformer is restricted to build up a pressure in the reformer.

* * * * *